United States Patent

Shimizu et al.

[11] Patent Number: 6,059,689
[45] Date of Patent: May 9, 2000

[54] CONTROL SYSTEM FOR AUTOMATIC VEHICLE TRANSMISSION

[75] Inventors: Masatoshi Shimizu; Tatsuyuki Ohashi; Masatoshi Nishina; Takamichi Shimada, all of Wako, Japan

[73] Assignee: Honda Giken Kogyo Kabushiki Kaisha, Tokyo, Japan

[21] Appl. No.: 09/324,847

[22] Filed: Jun. 3, 1999

[30] Foreign Application Priority Data

Jun. 4, 1998 [JP] Japan .................................. 10-172271
Jun. 4, 1998 [JP] Japan .................................. 10-172272

[51] Int. Cl.[7] .................................................. F16H 61/10
[52] U.S. Cl. .............................................................. 477/98
[58] Field of Search ................................................ 477/98

[56] References Cited

U.S. PATENT DOCUMENTS 4,811,223  3/1989  Iwatsuki et al. .......................... 477/98
4,825,372  4/1989  Yasue et al. ............................... 477/98

FOREIGN PATENT DOCUMENTS 8-312774  11/1996  Japan .

Primary Examiner—Dirk Wright
Attorney, Agent, or Firm—Armstrong, Westerman, Hattori, McLeland & Naughton

[57] ABSTRACT

A system for controlling an automatic transmission mounted on a vehicle, including an automatic mode in which a gear is retrieved from predetermined gearshift characteristics by the detected vehicle speed and the engine load and a manual mode in which a gear is designated by a device manually operated by a vehicle driver. In the system, a temperature in an exhaust pipe of the vehicle is estimated based on the detecting operating conditions and the gear designated in the manual mode is corrected to upshift by one gear, if the estimated exhaust pipe temperature is found to exceed a predetermined temperature, thereby improving avoidance of the occurrence of excessive thermal load of components in the vicinity of the exhaust pipe, and that, by not conducting forced upshift until such time, fully exploits the features of the manual mode and, by this, makes the product more appealing to customers.

25 Claims, 13 Drawing Sheets

CONTROL SYSTEM FOR AUTOMATIC VEHICLE TRANSMISSION

BACKGROUND OF THE INVENTION

1. Field of the Invention

This invention relates to a control system for an automatic vehicle transmission, more specifically to such a system for improving toughness against (avoidance of the occurrence of) excessive thermal load in the vicinity of the exhaust pipe of a vehicle equipped with an automatic transmission having a manual gearshift mode.

2. Description of the Prior Art

Automatic vehicle transmissions equipped with both automatic and manual gearshift modes have recently been developed. The automatic gearshift mode is implemented by an automatic gear ratio signal output means that determines the gear ratio by retrieval from predetermined gearshift characteristics based on vehicle speed and engine load and outputs a signal representing the determined (retrieved) gear ratio. The manual gearshift mode is implemented by a manual gear ratio signal output means that outputs a signal representing the designated gear ratio selected by a manual operation of the vehicle driver.

In the automatic gearshift mode, the gear (shift position or gear ratio) is retrieved from a predetermined shift pattern (gearshift characteristics) using the vehicle speed and the throttle opening (engine load) as address data. The so-determined gear (ratio) is established by energizing/de-energizing electromagnetic solenoid valves of a hydraulic circuit (gearshift mechanism) to shift up or down automatically.

In the manual gearshift mode, the gear (ratio) is selected (designated) by the driver according to the driver's intention. As a rule, automatic shifting is not conducted. A system has been developed, however, that makes an exception to this rule in order to prevent a vehicle driver operational error from causing vehicle operation in an over-revved state. Specifically, an over-rev prevention shift pattern (forced upshift line) having the vehicle speed and the throttle opening as parameters is defined and a forced upshift is effected when this line is exceeded.

An example of this technology can be found in Japanese Laid-open Patent Application Hei 8(1996)-312774. During high-load operating conditions, this earlier-developed technology moves the forced upshift line toward the low-vehicle-speed side to make upshift easier.

The whole point of the manual gearshift mode is, however, to allow the vehicle driver to select (designate) the gear (ratio) according to his or her intention and desire. Forced upshift, a form of automatic gearshift, detracts from this feature and makes driving less fun for the driver. As such, it lowers the product's appeal to customers.

On the other hand, when a forced upshift line is not established, an operating mistake on the part of the vehicle driver may lead to prolonged operation in an over-revved condition. When this happens, the temperature of the exhaust pipe downstream of the catalytic converter rises to increase the thermal load on nearby components. Conceivable measures for avoiding this problem include installing baffle plates between the exhaust pipe and surrounding components, increasing the clearance between the exhaust pipe and the nearby components, and adopting a double-wall exhaust pipe structure. Since all of these are impractical due to technical requirements and high costs, however, a more realistic solution has been desired.

SUMMARY OF THE INVENTION

The object of this invention is therefore to overcome the shortcomings of the prior art by providing an automatic vehicle transmission control system that estimates the temperature of the exhaust pipe based on detected operating conditions, effects correction by decreasing the gear ratio, i.e., changing in the upshift direction, when the estimated exhaust pipe temperature exceeds a prescribed temperature, thereby improving toughness against (avoidance of the occurrence of) excessive thermal load of components in the vicinity of the exhaust pipe, and that, by not conducting forced upshift until such a time, fully exploits the features of the manual gearshift mode and, by this, makes the product more appealing to customers.

To achieve this object, the invention provides a system for controlling an automatic transmission mounted on a vehicle having an automatic gearshift mode and a manual gearshift mode switchable from the automatic gearshift mode through a device manually operated by a vehicle driver to designate a gear ratio, including: operating condition detecting means for detecting operating conditions of the vehicle including at least a speed of the vehicle and a load of an engine mounted on the vehicle; automatic mode gear ratio signal generating means operable in the automatic gearshift mode for retrieving predetermined gearshift characteristics by at least the detected vehicle speed and the engine load to determine a gear ratio and for generating a first signal indicative of the determined gear ratio; manual mode gear ratio signal generating means operable in the manual gearshift mode for generating a second signal indicative of the gear ratio designated by the device; and gearshift controlling means for controlling a gearshift mechanism based on one of the first signal and the second signal, wherein the system includes; exhaust pipe temperature estimating means for estimating a temperature in an exhaust pipe of the vehicle based on the detected operating conditions; and wherein the gearshift controlling means corrects the designated gear ratio such that the designated gear ratio decreases, if the estimated exhaust pipe temperature is found to exceed a predetermined temperature, when the second signal is generated.

BRIEF EXPLANATION OF THE DRAWINGS

These and other objects and advantages of the invention will be made more apparent with the following description and drawings, in which.

DETAILED DESCRIPTION OF THE PREFERRED EMBODIMENTS

Embodiments of the invention will now be explained with reference to the attached drawings.

Figure 1:
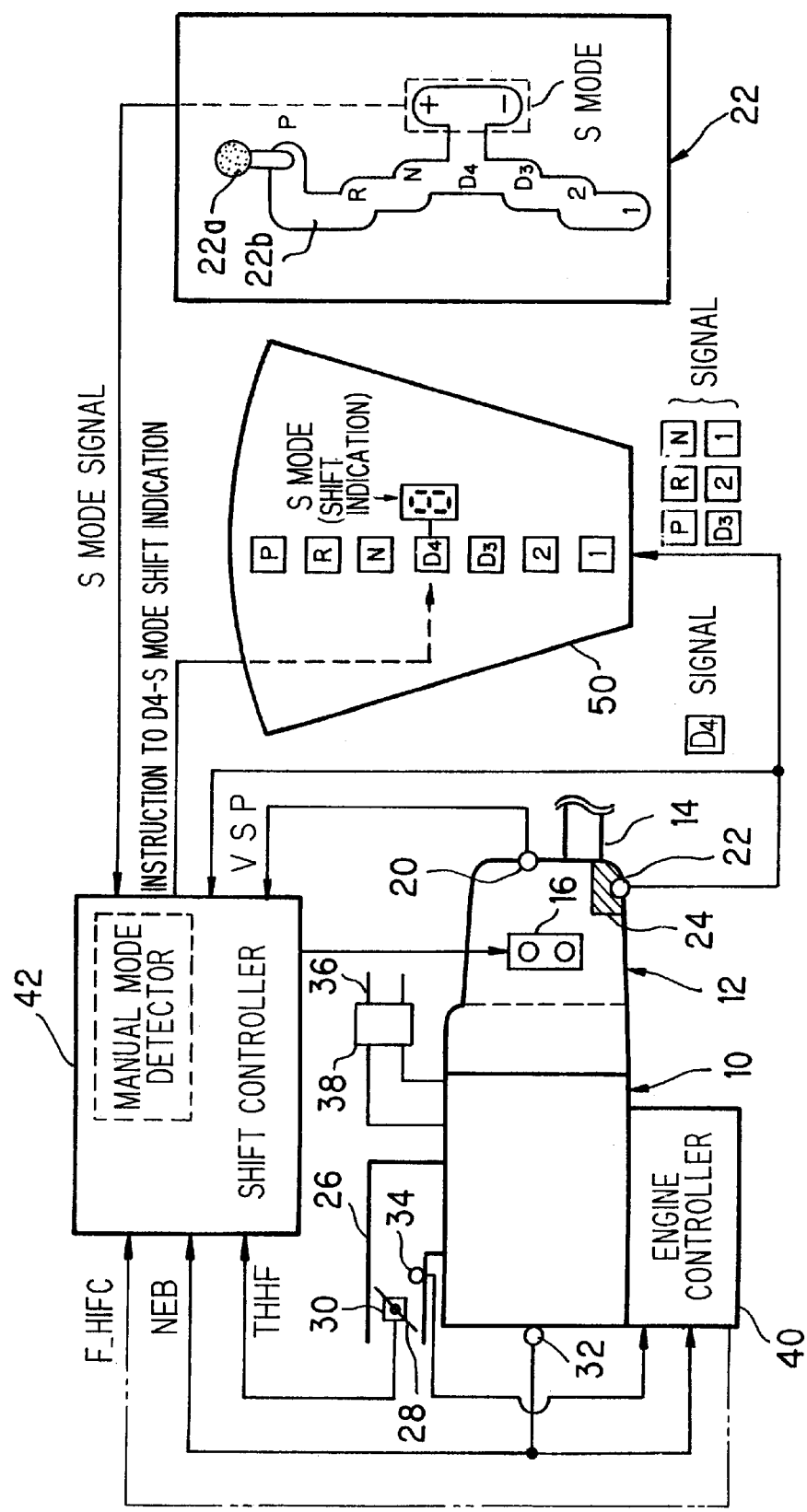
FIG. 1 is an overall schematic view of a control system for an automatic vehicle transmission.

FIG. 1 is an overall schematic view of a control system for an automatic vehicle transmission according to the invention.

As shown in FIG. 1, an automatic transmission 12 is mounted on a vehicle (not shown) and is installed on the output side of an internal combustion engine 10 which is also mounted on the vehicle. The automatic transmission 12 is a multi-step transmission with parallel shafts. It has five gears (gearshift positions or gear ratios), four forward and one reverse. The output shaft 14 of the automatic transmission 12 is connected to driven wheels (not shown) through a differential mechanism (not shown).

The automatic transmission 12 is equipped with four hydraulic clutches or other such frictional engaging elements (not shown) associated with the foregoing gears, and with hydraulic actuators (not shown) for supplying operating hydraulic pressure thereto. The operating hydraulic pressures supplied by the hydraulic actuators are controlled by different types of electromagnetic solenoid valves. For simplicity of illustration, the electromagnetic solenoid valves are designated collectively by reference numeral 16 in FIG. 1.

A vehicle speed sensor 20 provided near the output shaft 14 of the automatic transmission 12 outputs a pulse signal once every prescribed amount of rotation of the output shaft 14. A gate-type range selector 22 (appearing at two locations in FIG. 1) located on the vehicle floor near the driver's seat (not shown) has an associated position sensor 24 that outputs a signal indicative of the one of the range positions P, R, N, D4, D3, 2, and 1 selected by the vehicle driver.

A throttle position sensor 30, a potentiometer, is associated with a throttle valve 28 located in an air intake pipe 26 of the engine 10 and outputs a signal indicative of the degree of opening of the throttle valve 28. A crank angle sensor 32 disposed near a camshaft (not shown) or other appropriate member outputs a signal indicative of the crank angle of a piston (not shown).

A manifold absolute pressure sensor 34 installed in the air intake pipe 26 downstream of the throttle valve 28 outputs a signal indicative of the manifold absolute pressure in the air intake pipe 26.

In the engine 10, air is drawn from the air intake pipe 26 into an intake manifold (not shown) equipped with fuel injectors (not shown). The injectors inject fuel into the intake air to form an air-fuel mixture that is ignited in cylinder combustion chambers (not shown). The resulting exhaust gas is discharged through an exhaust manifold (not shown) and then passes into an exhaust pipe 36. A catalytic converter 38 is installed at an appropriate point in exhaust pipe 36 to remove NOx and other pollutants from the exhaust gas before discharging it into the atmosphere.

The outputs of the crank angle sensor 32 and the manifold absolute pressure sensor 34 are forwarded to an electronic control unit (engine controller) 40 for engine control. The engine controller 40, constituted as a microcomputer, calculates the engine speed NEB from the counted number of pulses (signals) output by the crank angle sensor 32.

The outputs of the vehicle speed sensor 20, the position sensor 24, the throttle position sensor 30 and the crank angle sensor 32 are forwarded to an electronic control unit (shift controller) 42 for gearshift control. The shift controller 42, also constituted as a microcomputer, calculates the engine speed NEB and the vehicle speed VSP from the counted number of pulses output by the crank angle sensor 32 and the vehicle speed sensor 20.

The range selector 22 is equipped with a slot 22b and a stick 22a fitted in the slot 22b. When the stick 22a is at the D4 position on the left side of the range selector 22 as viewed in the drawing, the shift controller 42 determines a gear (shift position or gear ratio) between first and fourth by retrieval from a predetermined shift pattern (gearshift characteristics) using the vehicle speed VSP and the throttle opening THHF detected via the vehicle speed sensor 20 and the throttle sensor 30 as address data.

When the stick 22a is at the D3 position of the range selector 22 on the left side in the drawing, the shift controller 42 determines a gear between first and third by retrieval using the vehicle speed VSP and the throttle opening THHF as address data. The gearshift control at the aforesaid D4 and D3 positions corresponds to the automatic gearshift mode (or automatic mode) mentioned earlier, and acts as an automatic mode gear ratio signal generating means for retrieving the aforesaid predetermined gearshift characteristics by at least the detected vehicle speed VSP and the engine load (i.e., the throttle opening THHF) to determine the gear (gear ratio) and for generating a first signal indicative of the determined gear ratio.

When the stick 22a is at the D4 position, the vehicle driver can move it from the D4 position through a gate to a slot on the right in the drawing. The driver can then shift up one gear from the gear determined in the D4 position by moving the stick 22a upward in the right slot (toward the + side). After this, the driver can shift up one gear at a time by repeatedly moving the stick 22a upward (toward the + side).

Otherwise, upon moving the stick 22a into the right slot, the driver can then shift down one gear from the gear determined in the D4 position by moving the stick 22a downward in the right slot (toward the − side). After this, the driver can shift down one gear at a time by repeatedly moving the stick 22a downward (toward the − side). When the driver releases the stick 22a, it is returned to the neutral (center) position of the right slot by a mechanism not shown in the drawing.

The position of the stick 22a in the left slot is detected by the position sensor 24 and the upward (+ side) and downward (− side) positions thereof in the right slot are detected by a separate sensor (not shown). The outputs of the sensors are sent to the shift controller 42. The shift controller 42 shifts up or down in response to the sensor inputs by energizing/de-energizing the electromagnetic solenoid valves 16 of the hydraulic actuators. This control corresponds to the manual gearshift mode (or manual mode; designated S mode in FIG. 1) mentioned earlier and acts as a manual gearshift mode gear ratio signal generating means for generating a second signal indicative of the gear (gear ratio) designated by a device (i.e., the stick 22a) manually operated by a vehicle driver.

An indicator 50 is provided on an instrument panel (not shown) visible from the driver's seat. The shift controller 42 lights the mark P, R, . . . corresponding to the selected range position.

When the selection is changed from the D4 range to the manual gearshift mode (S mode), the shift controller 42 indicates that manual gearshift mode operation is in effect by lighting the figure "8" mark shown in the figure. As explained further later, the figure "8" mark (shift indication) is made to flash on and off at the time of shifting up owing to an increase in the estimated exhaust pipe temperature.

The operation of the control system for an automatic vehicle transmission according to the present invention will now be explained with reference to FIG. 2.

In accordance with its characterizing feature, this control system estimates the temperature of the exhaust pipe 36, more exactly the internal temperature of the exhaust pipe 36, and determines whether to maintain the manual gearshift mode gear or to shift up. The explanation will therefore focus on this point. The illustrated program is executed once every 10 msec.

First, in S10, it is checked whether the detected throttle opening THHF is equal to or less than throttle opening CTH corresponding to full-closed. When the result is No, it is checked in S12 whether the bit of a flag F_FIHFC (initial value 0) is set to 1.

The bit of the flag F_FIHFC is set to 1 when a prescribed state is discriminated in a subroutine for discriminating F/C (fuel cutoff) explained below. The fact that the bit of this flag is set to 1 means that high-engine-speed F/C conditions are established.

Figure 3:
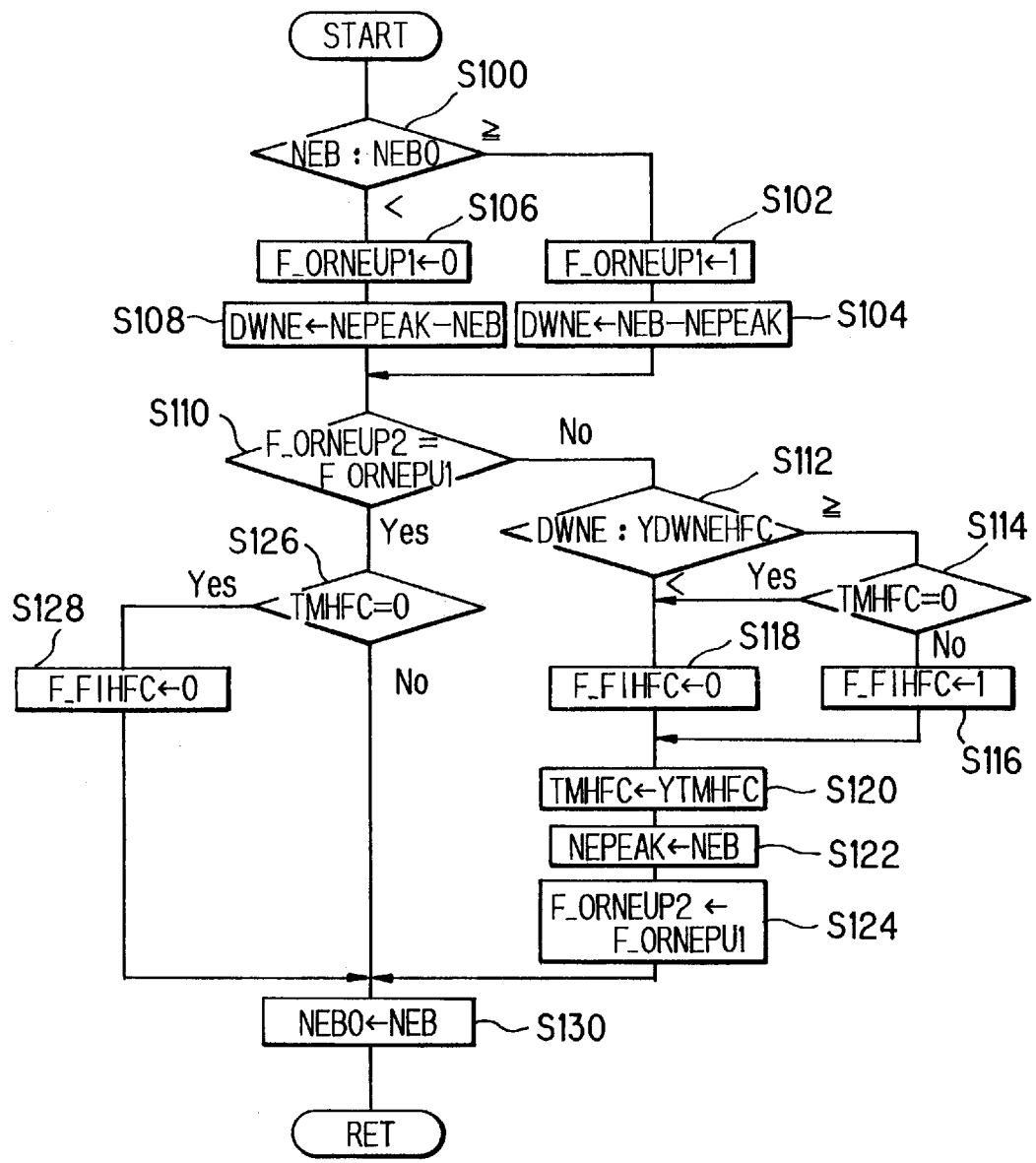
FIG. 3 is a flow chart showing the subroutine of discriminating a high-engine-speed F/C (fuel cutoff) condition referred to in the flow chart of FIG. 2.

FIG. 3 is a flow chart of the subroutine for this processing.

Figure 2:
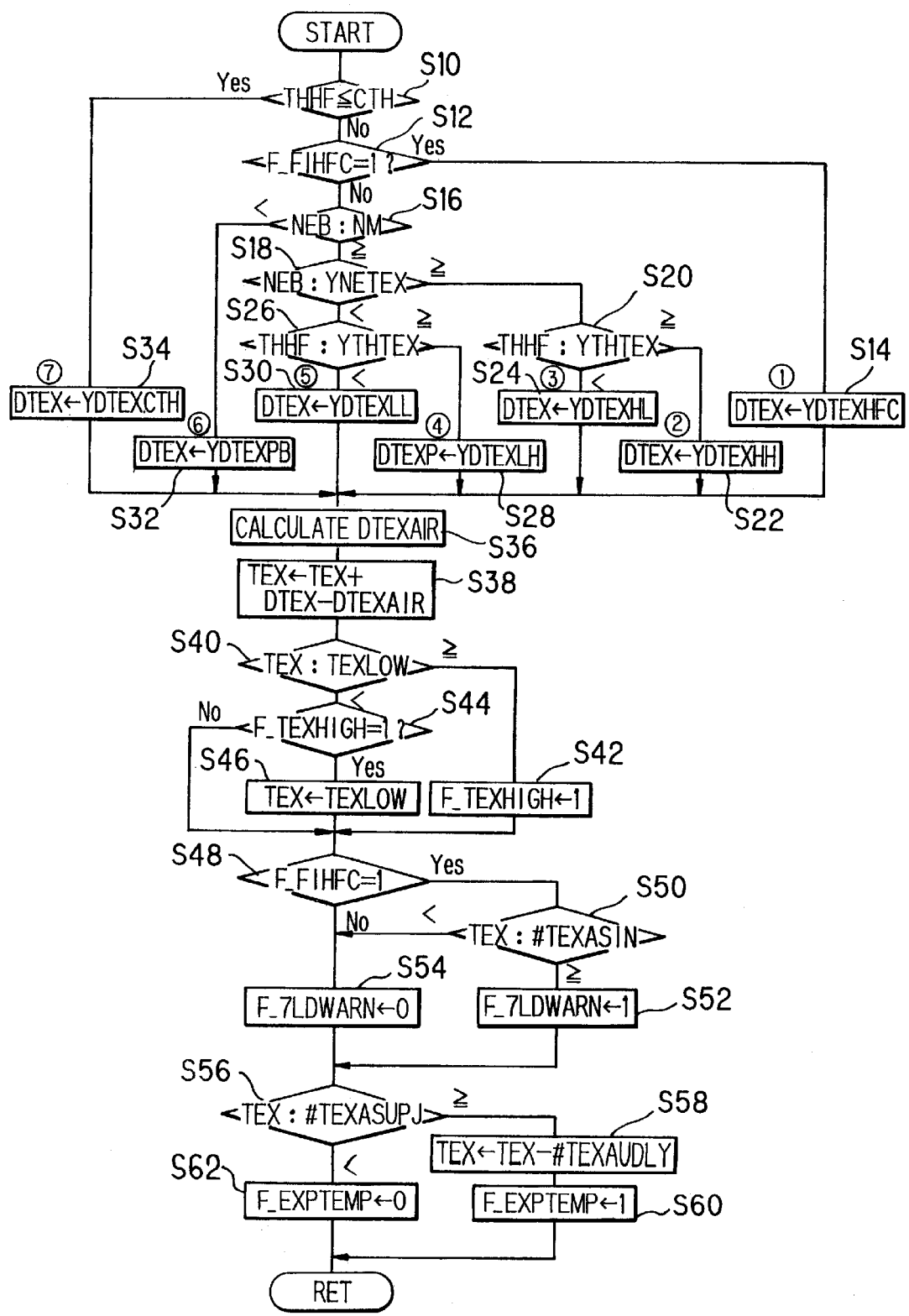
FIG. 2 is a flow chart showing the operation of the system illustrated in FIG. 1.

First, in S100, the engine speed NEB detected in the current cycle (more precisely, in the current cycle of the flow chart of FIG. 2) is compared with the engine speed NEB0 detected in the preceding program loop (cycle), more precisely, in the preceding program loop of the flow chart of FIG. 2.

When it is found in S100 that the current detected engine speed is equal to or greater than the preceding detected engine speed, i.e., that the engine speed is rising, the bit of a flag F_ORNEUP1 indicating the current engine speed change direction (initial value 0) is set to 1 in S102, whereafter inflection point engine speed NEPEAK is subtracted from the current detected engine speed NEB in S104 to calculate the engine speed fluctuation amplitude DWNE up to the inflection point.

On the other hand, when it is found in S100 that the current detected engine speed is less than the preceding detected engine speed, i.e., that the engine speed is falling, the bit of the flag F_ORNEUP1 is reset to 0 in S106, whereafter the current detected engine speed NEB is subtracted from the inflection point engine speed NEPEAK in S108 to calculate the amplitude DWNE of the engine speed fluctuation up to the inflection point. The operations of S104 and S108 make it unnecessary to discriminate polarity (+ or −) when calculating the difference in engine speed.

Next, in S110, it is checked whether the bit of flag F_ORNEUP1 indicating the current engine speed change direction and the bit of a flag F_ORNEUP2 indicating the engine speed change direction up to the preceding cycle are the same.

When the result in S110 is No, it follows that the engine speed change directions are not the same, i.e., that the engine speed turned about. Therefore, in S112, the amplitude DWNE of engine speed fluctuation up to the inflection point is compared with an engine speed fluctuation amplitude YDWNEHFC for discriminating high-engine-speed F/C.

When it is found in S112 that the amplitude DWNE of the engine speed fluctuation up to the inflection point is equal to or less than the engine speed fluctuation amplitude YDWNEHFC for discriminating high-engine-speed F/C, it is checked in S114 whether the value of a timer (down counter) TMHFC for discriminating high-engine-speed F/C has reached 0 (whether a prescribed time period has passed).

Since this timer begins counting down later, in S120, the result in S114 is No in the first program loop (cycle), and next, in S116, the bit of the flag F_FIHFC for discriminating high-engine-speed F/C is set to 1 and it is discriminated that a high-engine-speed F/C condition has occurred.

This will be explained with reference to FIGS. 4 to 6. In the system of this embodiment, high-engine-speed F/C condition is discriminated logically with no supply of the pertinent signal being received from the engine controller 40.

Figure 4:
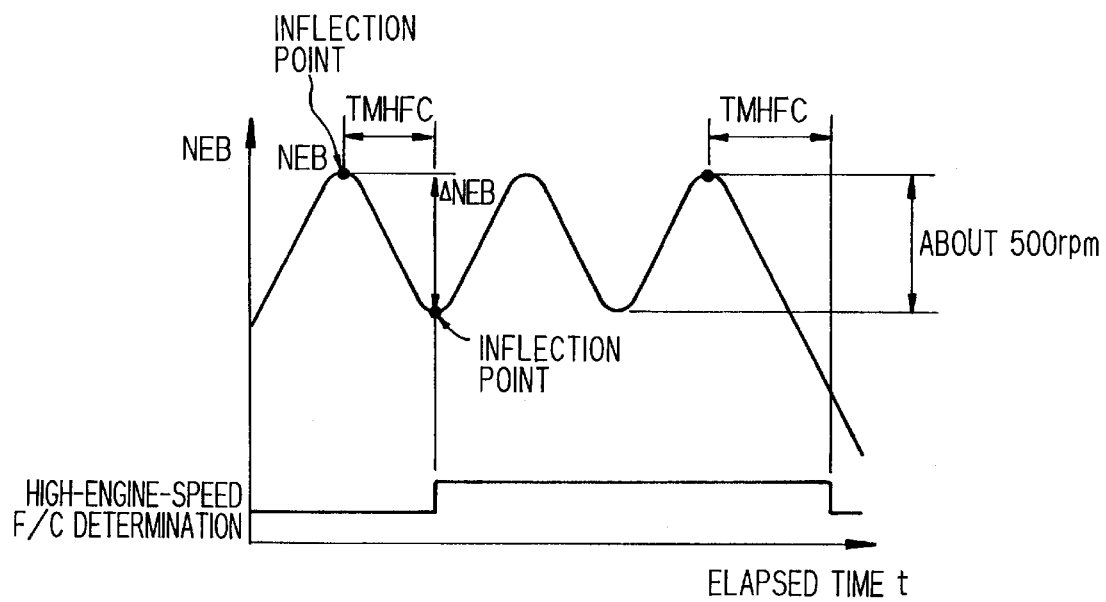
FIG. 4 is a time chart explaining the discriminating of the high-engine-speed F/C (fuel cutoff) condition illustrated in the flow chart of FIG. 2.

Specifically, as shown in FIG. 4, it is concluded that an F/C condition at high engine speed has occurred if an inflection occurs in the engine speed within a prescribed time period (corresponding to the down count value YTMHFC (explained later) of the timer TMHFC) and the fluctuation amplitude (amplitude DWNE of engine speed fluctuation up to inflection point) exceeds a prescribed range (the engine speed fluctuation amplitude YDWNEHFC for discriminating high-engine-speed F/C).

Figure 5:
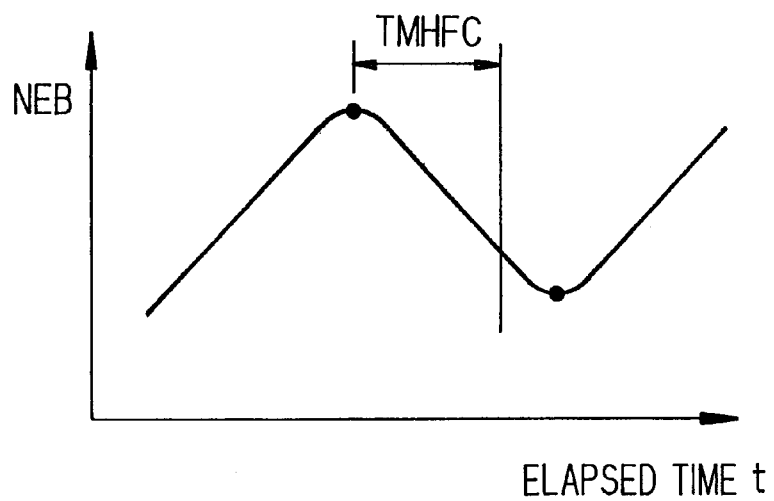
FIG. 5 is a time chart similarly explaining the discriminating of the high-engine-speed F/C (fuel cutoff) condition illustrated in the flow chart of FIG. 2.
Figure 6:
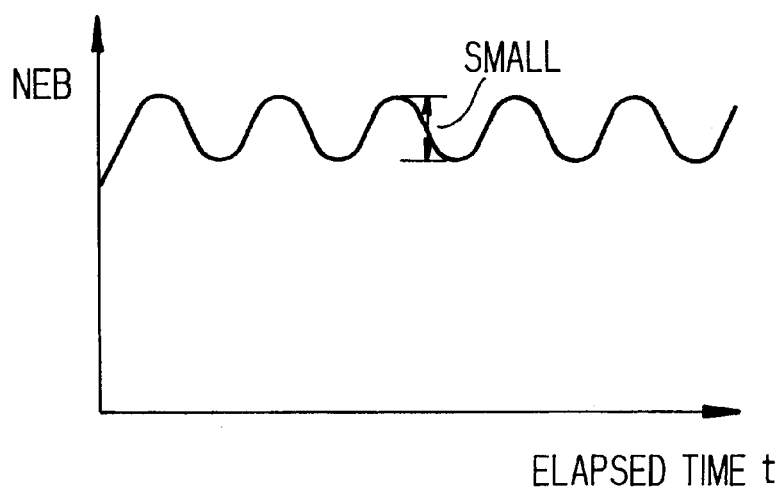
FIG. 6 is a time chart similarly explaining the discriminating of the high-engine-speed F/C (fuel cutoff) condition illustrated in the flow chart of FIG. 2.

Taking the opposite point of view, occurrence of an F/C condition at high engine speed is not discriminated when, as shown in FIG. 5, the timed passed up to the inflection point is greater than a prescribed time period or when, as shown in FIG. 6, the fluctuation amplitude is less than a prescribed amplitude.

This feature of the embodiment permits a simpler configuration, because no signal is required from the engine controller 40, and it enables highly accurate discrimination of whether or not F/C at high engine speed has occurred.

The explanation of FIG. 3 will be continued. When the result in S114 is Yes, then for the reason explained above, the bit of the flag F_FIHFC for discriminating high-engine-speed F/C is reset to 0 in S118 and it is not discriminated that an F/C (fuel cutoff) condition at high engine speed has occurred.

Next, in S120, the timer TMHFC is set to the value of YTMHFC corresponding to the aforesaid prescribed time period and countdown is commenced. Then, in S122, the inflection point engine speed NEPEAK is set to the engine speed NEB detected in the current cycle. This is done irrespective of whether a high-engine-speed F/C condition was discriminated, so as to establish the engine speed at that time as the inflection point engine speed, since an engine speed inflection did occur.

Next, in S124, in preparation for the comparison in S110 in the following program loop (cycle), the flag F_ORNEUP2 indicating the engine speed change direction up to the preceding cycle is overwritten with the flag F_ORNEUP1 indicating the current engine speed change direction.

When the result in S110 is Yes, it can be concluded that the engine speed change directions are the same, i.e., that the engine speed did not turn about. Therefore, in S126, it is checked whether the value of the timer TMHFC for discriminating high-engine-speed F/C has reached 0.

Since an affirmative result (Yes) in S126 means that the prescribed time period passed without an engine speed inflection, the bit of the high-engine-speed F/C signal flag F_FIHFC is reset to 0 in S128 and, in preparation for the comparison in S100 in the following program loop (cycle), the engine speed detected in the preceding loop NEB0 is overwritten with the current detected engine speed NEB in S130. S128 is skipped when the result in S126 is No.

The explanation of FIG. 2 will be continued.

In S12, it is checked whether the bit of the high-engine-speed F/C signal flag F_FIHFC is set to 1. When the result is Yes, it is concluded that a high-engine-speed F/C condition has occurred, whereafter an exhaust pipe temperature change amount DTEX is set to a first prescribed value YDTEXHFC.

When the result in S12 is No, the detected engine speed NEB is compared with a first reference engine speed NM in S16. When the detected engine speed NEB is found to be equal to or greater than the first reference engine speed NM, it is judged that the vehicle is accelerating. The detected engine speed NEB is then compared with a second reference engine speed YNETEX in S18.

When it is found in S18 that the detected engine speed NEB is equal to or greater than the second reference engine speed YNETEX, the engine speed is judged to be high. The detected throttle opening THHF is then compared with a reference throttle opening YTHTEX in S20.

When it is found in S20 that the detected throttle opening THHF is equal to or greater than the reference throttle opening YTHTEX, the throttle opening is judged to be large. The exhaust pipe temperature change amount DTEX is then compared with a second prescribed value YDTEXHH in S22.

On the other hand, when it is found in S20 that the detected throttle opening THHF is less than the reference throttle opening YTHTEX, the throttle opening is judged to be small. The exhaust pipe temperature change amount DTEX is then set to a third prescribed value YDTEXHL in S24.

When it is found in S18 that the detected engine speed NEB is less than the second reference engine speed YNETEX, the engine speed is judged to be low. The detected throttle opening THHF is then compared with the reference throttle opening YTHTEX in S26.

When it is found in S26 that the detected throttle opening THHF is equal to or greater than the reference throttle opening YTHTEX, the throttle opening is judged to be large. The exhaust pipe temperature change amount DTEX is set to a fourth prescribed value YDTEXLH in S28. On the other hand, when it is found in S26 that the detected throttle opening THHF is less than the reference throttle opening YTHTEX, the throttle opening is judged to be small. The exhaust pipe temperature change amount DTEX is then set to a fifth prescribed value YDTEXLL in S30.

When it is found in S16 that the detected engine speed NEB is less than the first reference engine speed NM, it is judged that the vehicle is decelerating. The exhaust pipe temperature change amount DTEX is then set to a sixth prescribed value YDTEXPB in S32.

When the result in S10 is Yes, the exhaust pipe temperature change amount DTEX is set to a seventh prescribed value YDTEXCTH in S34.

Figure 7:
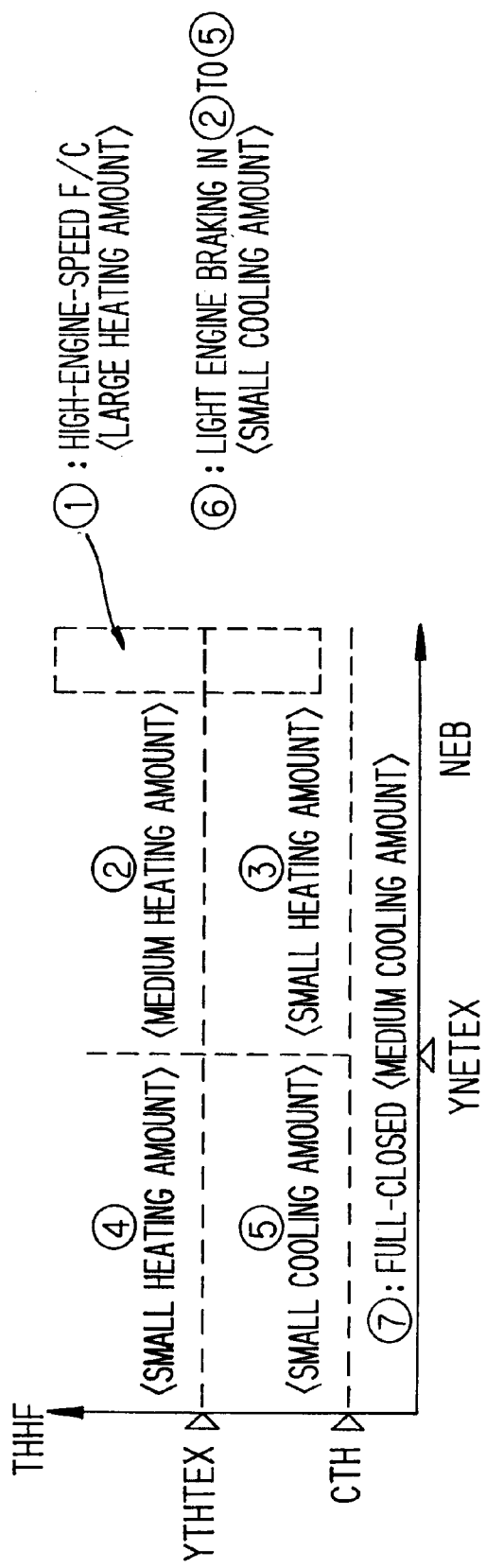
FIG. 7 is an explanatory graph showing the characteristics of the prescribed values of the exhaust pipe temperature change amount referred to in the flow chart of FIG. 2.

The first to seventh prescribed values of the exhaust pipe temperature change amount are shown in FIG. 7.

As shown, the engine operating condition is defined in terms of the engine speed NEB and the throttle opening THHF, and is divided into seven regions using the foregoing reference values. Each region is assigned one of the first to seventh prescribed values as its exhaust pipe temperature change amount. In FIG. 7, each of the first to seventh prescribed values is indicated by a circled numeral and is accompanied by an annotation indicating whether it is a heating amount or a cooling amount and the relative degree thereof.

For instance, the first prescribed value YDTEXHFC (circle 1) represents the (estimated) exhaust pipe temperature change amount in a high-engine-speed F/C condition and is therefore a heating amount (i.e., a positive value) set to a relatively large value. Therefore, when this value is used to calculate the estimated exhaust pipe temperature TEX in the manner explained later, the result is a relatively high temperature.

The second prescribed value YDTEXHH (circle 2) represents the (estimated) exhaust pipe temperature change amount in a high-engine-speed, large-throttle-opening condition during vehicle acceleration and is therefore a heating amount (i.e., a positive value) set to a relatively medium value.

The third prescribed value YDTEXHL (circle 3) represents the (estimated) exhaust pipe temperature change amount in a high-engine-speed, small-throttle-opening condition during vehicle acceleration and is therefore a heating amount (i.e., a positive value) set to a relatively small value.

The fourth prescribed value YDTEXLH (circle 4) represents the (estimated) exhaust pipe temperature change amount in a low-engine-speed, large-throttle-opening condition during vehicle acceleration and is therefore a heating amount (i.e., a positive value) set to a relatively small value.

The fifth prescribed value YDTEXLL (circle 5) represents the (estimated) exhaust pipe temperature change amount in a low-engine-speed, small-throttle-opening condition during vehicle deceleration and is therefore deemed to be a cooling amount (i.e., a negative value) and is set to a relatively small value.

The sixth prescribed value YDTEXPB (circle 6) is deemed to be a cooling amount (i.e., a negative value) during vehicle deceleration, more specifically an operating state like one of circle 2 to 5 with light engine braking effect such as during tractor-trailer or hill descents. It is set to a relatively small value.

The seventh prescribed value YDTEXCTH (circle 7) is assigned to the full-closed throttle region and is therefore deemed to be a cooling amount (i.e., a negative value). It is set to a relatively medium value.

The explanation of FIG. 2 will be continued.

Next, in S36, the exhaust pipe cooling component DTEXAIR (positive value) corresponding to vehicle air speed (wind) is calculated as:

$$DTEXAIR = VLVH \cdot YKDTEXA \cdot YDTEXAIR$$

where

VLVH: vehicle speed

YKDTEXA: coefficient

YDTEXAIR: cooling component by heat radiation when vehicle stopped

Next, in S38, the estimated exhaust pipe temperature TEX is calculated (updated) using the indicated equation. Specifically, the exhaust pipe temperature change amount DTEX is added to the estimated exhaust pipe temperature TEX (added when a positive value, subtracted when a negative value) and the exhaust pipe cooling component DTEXAIR (positive value) corresponding to vehicle air speed is subtracted from the result.

Next, in S40, the estimated exhaust pipe temperature TEX is compared with a lower limit value TEXLOW. When the estimated exhaust pipe temperature TEX is found to be equal to or greater than the lower limit value TEXLOW, the bit of an exhaust pipe temperature rise one-way flag F_TEXHIGH (initial value 0) is set to 1 in S42.

When the estimated exhaust pipe temperature TEX is found to be less than the lower limit value TEXLOW, it is checked in S44 whether the bit of the exhaust pipe temperature rise one-way flag F_TEXHIGH is set to 1. When the result is No, S46 is skipped. When it is Yes, the estimated exhaust pipe temperature TEX is set to the lower limit value TEXLOW in S46.

Figure 8:
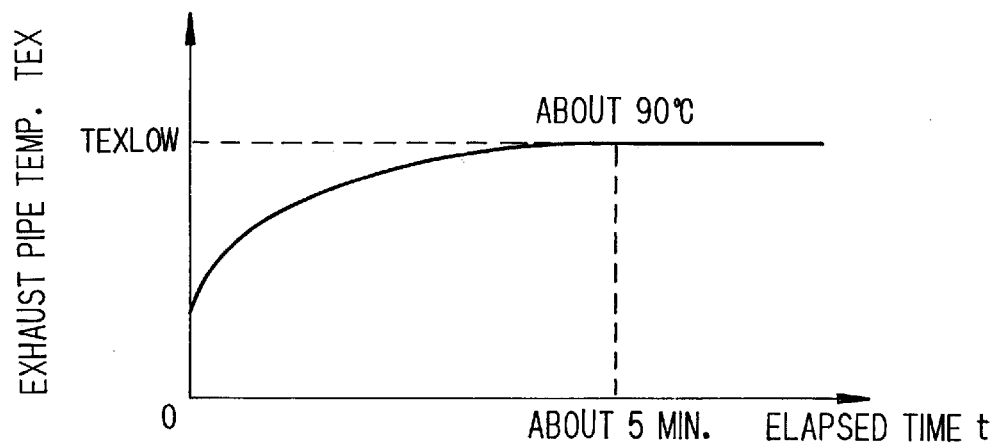
FIG. 8 is an explanatory graph showing the characteristic of the low limit value TEXLOW referred to in the flow chart of FIG. 2.

FIG. 8 is a graph for explaining the lower limit value TEXLOW. When the vehicle is left to stand with the engine running, the estimated exhaust pipe temperature TEX gradually rises until saturating after about five minutes. The lower limit value TEXLOW is set to this saturated temperature. This enables gearshift control within a range that is also effective in terms of optimizing emissions control.

Since bit of the exhaust pipe temperature rise one-way flag F_TEXHIGH is set to 1 in S42 after once finding in S40 that the estimated exhaust pipe temperature TEX is equal to or greater than the lower limit value TEXLOW, it is overwritten with the lower limit value by S44 and S46 even if the estimated exhaust pipe temperature TEX thereafter falls below the lower limit value. This still more certainly enables control within a range that is also effective in terms of optimizing emissions control.

Figure 9:
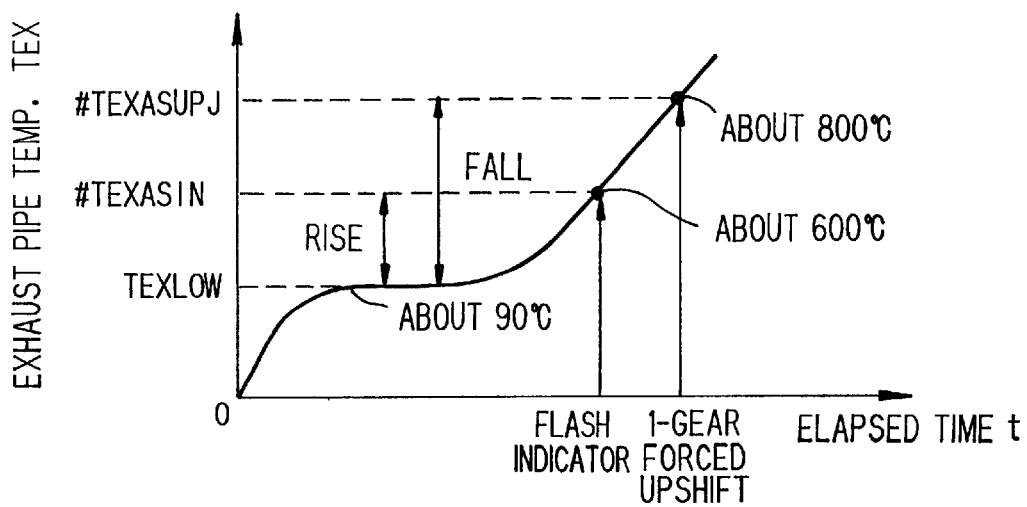
FIG. 9 is an explanatory graph explaining the shift indication flash request threshold value #TEXASIN referred to in the flow chart of FIG. 2.

Next, in S48, it is checked whether the bit of the flag F_FIHFC indicating presence of high-engine-speed conditions is set to 1. When the result is Yes, the estimated exhaust pipe temperature TEX is compared with a shift indication flash request threshold value #TEXASIN in S50. The shift indication flash request threshold value #TEXASIN is shown in FIG. 9.

When it is found in S50 that the estimated exhaust pipe temperature TEX is equal to or greater than the shift indication flash request threshold value #TEXASIN, the bit of a shift indication flash request flag F_7LDWARN (initial value 0) is set to 1 in S52. In a manual gearshift mode control routine not shown in the drawings, this causes the figure "8" mark of the indicator 50, i.e., the indication of shifting in manual gearshift mode operation, to flash. The vehicle driver will therefore not be surprised by an unexpected upshift.

When the result is No in S48, the bit of the shift indication flash request flag F_7LDWARN is reset to 0 in S54. Thus when the operating condition is not one in which the high-engine-speed F/C signal is output, no comparison is made between the estimated exhaust pipe temperature TEX and the shift indication flash request threshold value #TEXASIN and, therefore, no shift indication flash request is made.

Similarly, when it is found in S50 that the estimated exhaust pipe temperature TEX is less than the shift indication flash request threshold value #TEXASIN, the bit of F_LDWARN is set to zero, and no shift indication flash request is made.

Next, in S56, the estimated exhaust pipe temperature TEX is compared with a forced upshift execution threshold #TEXASUPJ. The forced upshift execution threshold #TEXASUPJ is shown in FIG. 9. The shift indication flash request threshold value #TEXASIN and the forced upshift execution threshold #TEXASUPJ are assigned different values for different gears.

When it is found in S56 that the estimated exhaust pipe temperature TEX is equal to or greater than the forced upshift execution threshold #TEXASUPJ, a temperature pullback amount for preventing successive upshifts #TEXAUDLY is subtracted from the estimated exhaust pipe temperature TEX in S58. This prevents one-gear upshift commands from being successively issued during gearshift.

Next, in S60, the bit of a forced upshift request flag F_EXPTEMP (initial value 0) is set to 1. This setting of the bit of the flag F_EXPTEMP (initial value 0) to 1 means that the gear (shift position or gear ratio) is forcibly shifted up one speed in the manual gearshift mode control routine not shown in the drawings.

When it is found in S56 that the estimated exhaust pipe temperature TEX is less than the forced upshift execution threshold #TEXASUPJ, the bit of the flag F_EXPTEMP is reset to 0 in S62. Therefore, in the manual gearshift mode control routine not shown in the drawings, control is effected to maintain the current gear (shift position or gear ratio).

Figure 10:
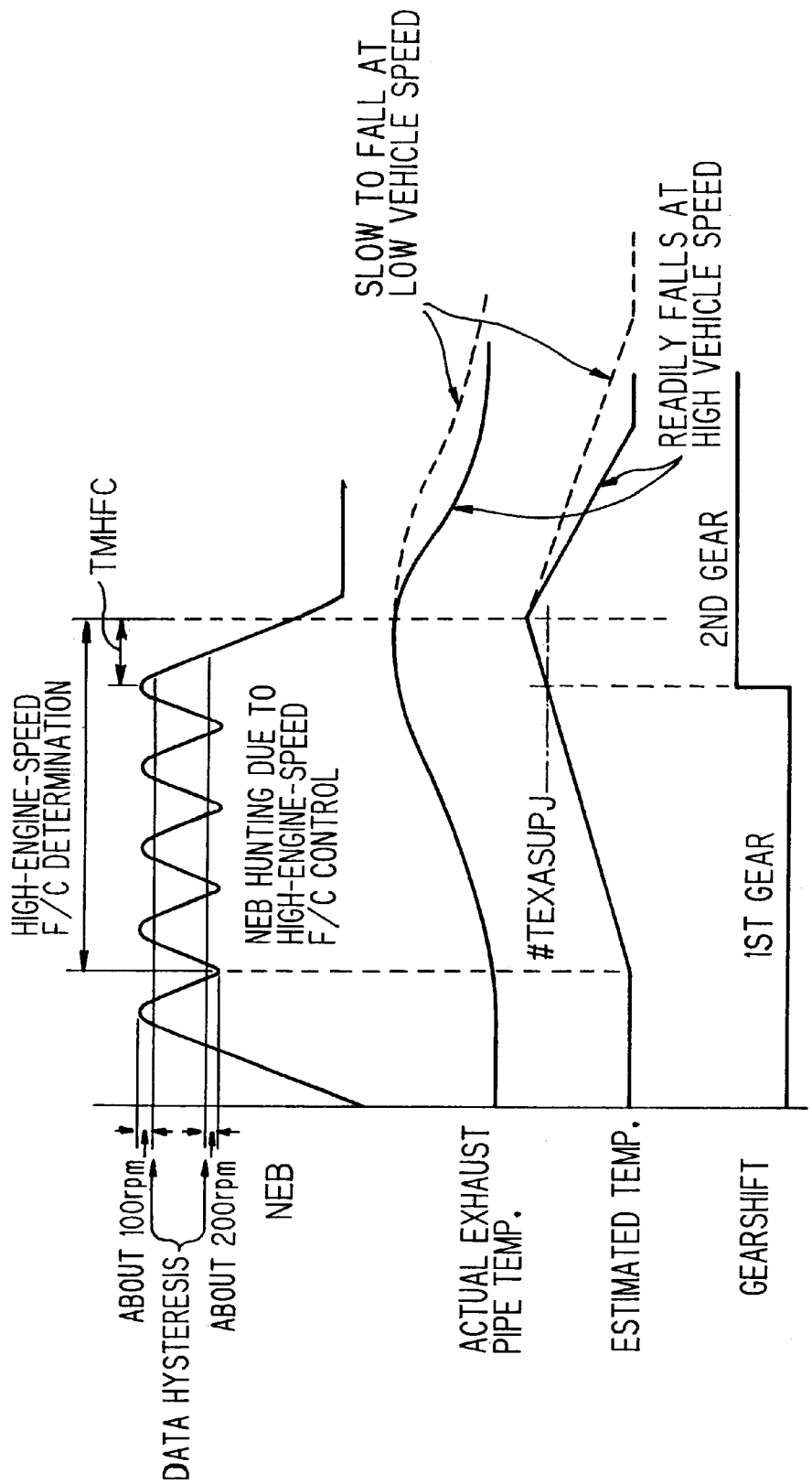
FIG. 10 is a time chart explaining the procedures illustrated in the flow chart of FIG. 2.

The foregoing explanation of the control will now be amplified with reference to the time chart of FIG. 10. When the engine speed NEB rises to a high-engine-speed level and then undulates continuously, the control system according to this embodiment judges, as explained in the foregoing, that the engine 10 has entered a high-engine-speed F/C condition. When this condition arises intermittently as shown in FIG. 10, fuel cooling cannot occur. The temperature of the engine 10 therefore rises and, as shown in the figure, the actual temperature of the exhaust pipe 36 downstream of the catalytic converter 38 also rises.

Therefore, in this control system, every time high-engine-speed F/C is conducted, the exhaust pipe temperature change amount DTEX is set to the large value YDTEXHFC in S14 and is added to the estimated exhaust pipe temperature in S38.

Further, when the estimated exhaust pipe temperature TEX becomes equal to or greater than the threshold #TEXASUPJ, a 1-gear upshift is effected (from first to second gear in the illustrated example). As this lowers the engine speed NEB, it also decreases the actual exhaust pipe temperature. In response to the decrease in the actual exhaust pipe temperature, the exhaust pipe temperature change amount DTEX is set to a smaller value such as YDTEXLH or to a negative value such as YDTEXLL. As shown, the estimated value therefore also declines.

Moreover, as explained above, the exhaust pipe temperature change amount DTEX is set according to the operating state as shown in FIG. 7. Therefore, as shown in FIG. 11, a distinction is made between the high-engine-speed period during which fuel cutoff is effected and the immediately preceding high-engine-speed period.

Figure 11:
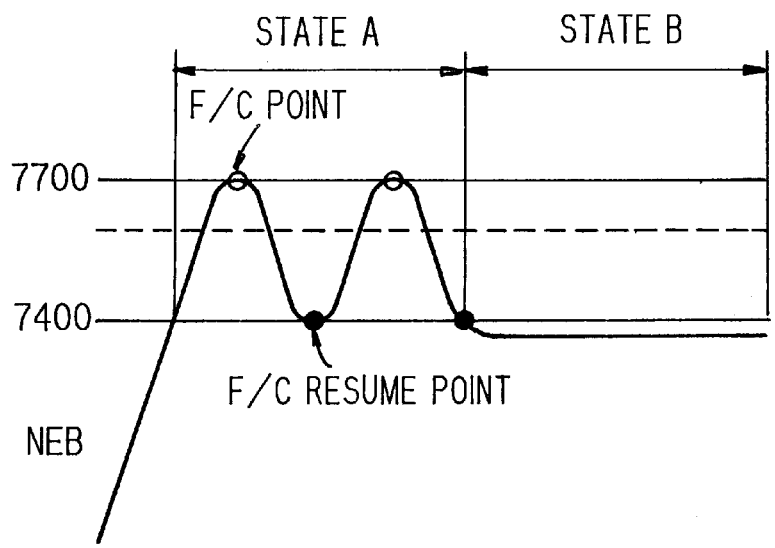
FIG. 11 is a time chart further explaining the procedures illustrated in the flow chart of FIG. 2.

Specifically, the state designated A in FIG. 11 is a high-engine-speed period during which fuel cutoff is effected and falls in the region designated circle 1 in FIG. 7. The state designated B is an immediately preceding high-engine-speed period falling in the region designated circle 2 in FIG. 7. These two operating states can be distinguished because the exhaust pipe temperature change amount DTEX is set to YDTEXHFC for the former and to YDTEXHH for the latter. As it is therefore possible to avoid error in estimating the exhaust pipe temperature, no unnecessary upshift occurs.

Figure 12:
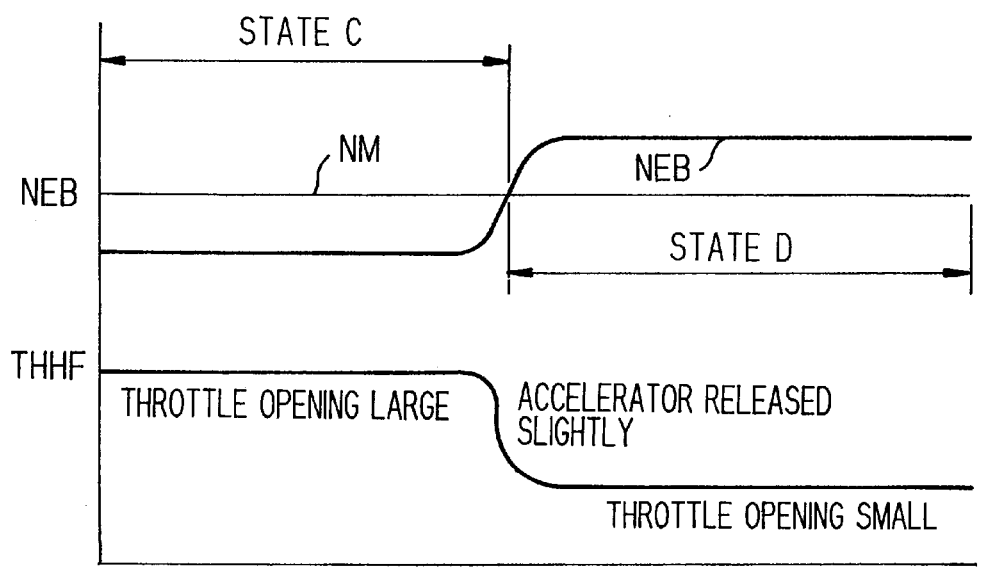
FIG. 12 is a time chart further explaining the procedures illustrated in the flow chart of FIG. 2.

Moreover, since the exhaust pipe temperature change amount DTEX is set according to the operating conditions as shown in FIG. 7, the exhaust pipe temperature can, as shown in FIG. 12, be estimated taking into account trailer-hauling and the like.

Since error in estimating the exhaust pipe temperature can thus be avoided even when the engine braking effect is utilized at high-engine-speed, such as during trailer-hauling, no upshift occurs under such circumstances. State C in FIG. 12 corresponds to the region designated circle 2 in FIG. 7 and state D to the region designated circle 6 in FIG. 7.

In FIG. 10, the solid line portions of the actual and estimated exhaust pipe temperature curves indicate values during high vehicle speed and the broken line portions thereof indicate values during low vehicle speed. As indicated, the exhaust pipe temperature falls more readily at the time of high vehicle speed owing to the vehicle air speed (wind).

The exhaust pipe temperature can nevertheless be accurately estimated because the exhaust pipe cooling component DTEXAIR produced by wind proportional to the vehicle speed VLVH is calculated in S36 and the result is subtracted from the estimated exhaust pipe temperature in S38.

Figure 13:
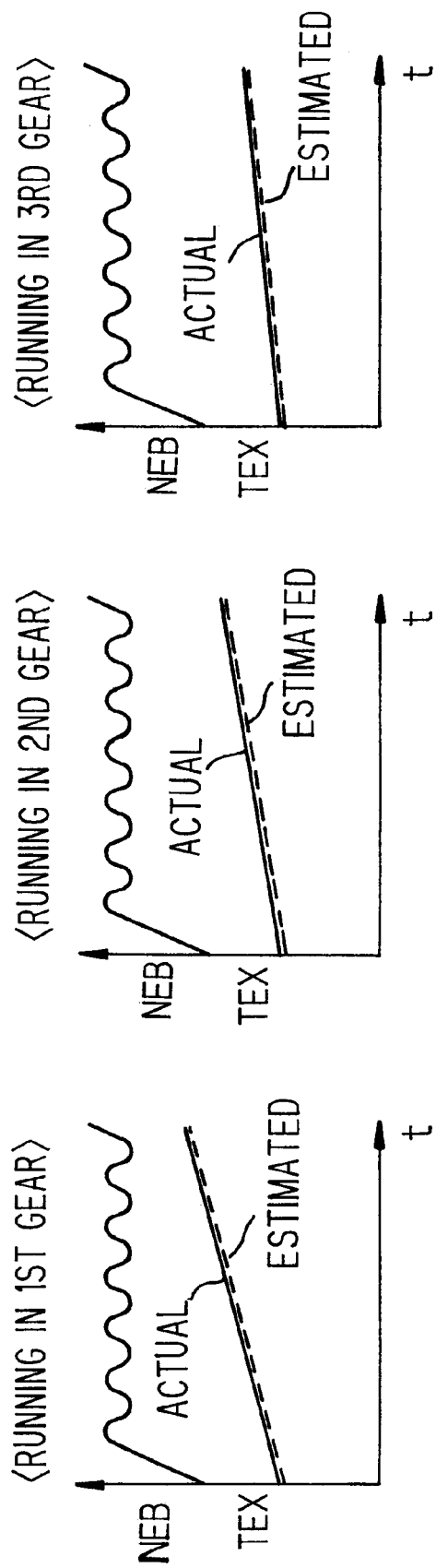
FIG. 13 includes three time charts showing the exhaust pipe temperature estimation taking into account the cooling component produced by wind proportional to the vehicle speed.

Specifically, the cooling component owing to the vehicle air speed is taken into account as shown in FIG. 13. Since a value near the actual exhaust pipe temperature can therefore be estimated during high-engine-speed fuel cutoff irrespective of the gear ratio, the precision of the estimation can be improved.

Figure 14:
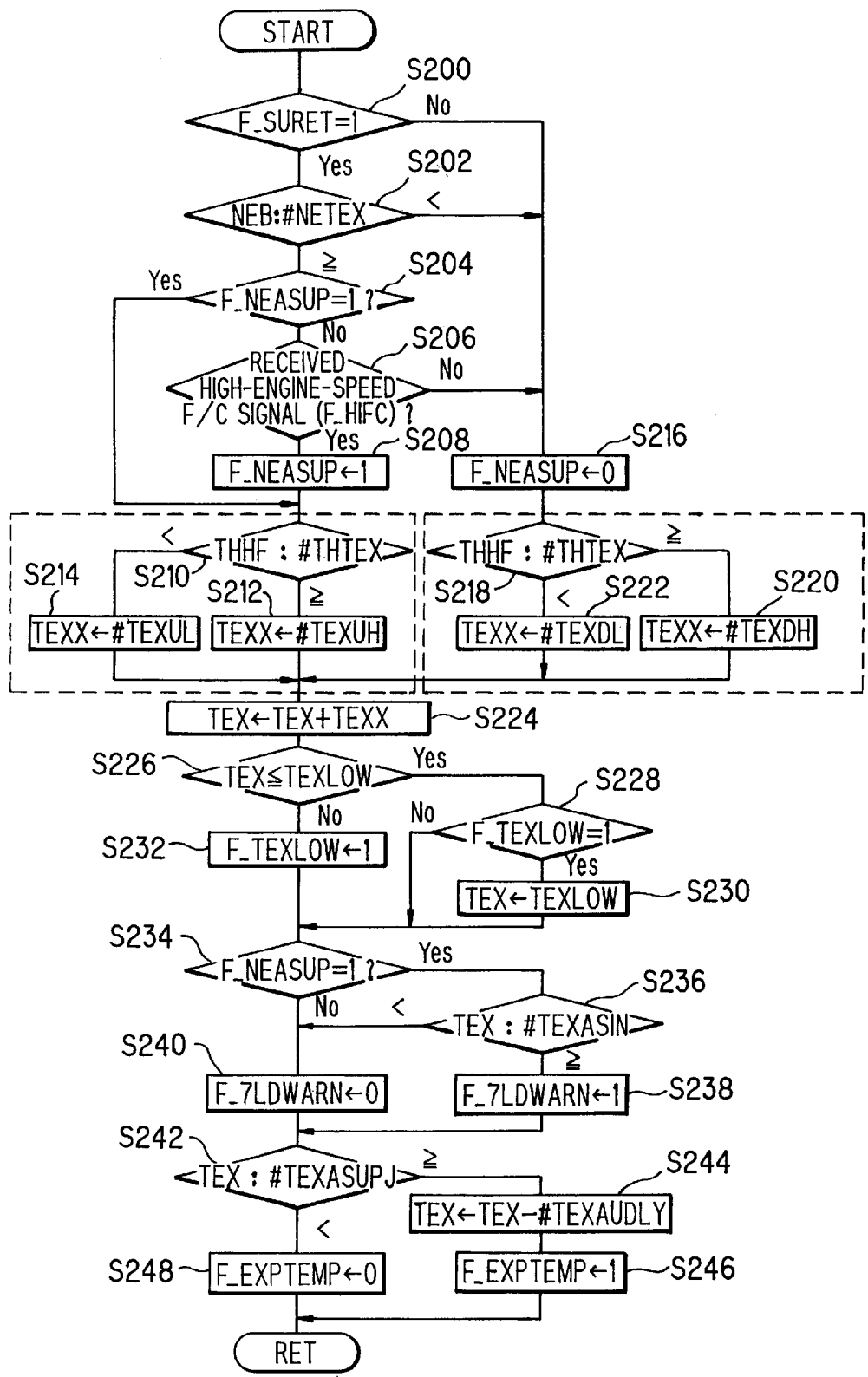
FIG. 14 is a flow chart, similar to FIG. 2, but showing a control system for an automatic vehicle transmission according to a second embodiment of the invention.

FIG. 14 is a flow chart, similar to FIG. 2, but showing the operation of a control system for an automatic vehicle transmission according to a second embodiment of the invention.

First, in S200, it is checked whether the bit of a flag F_SURET (initial value 0) is set to 1. This is to check whether the manual gearshift mode is in effect. When the result is Yes, the detected engine speed NEB is compared with a prescribed engine speed #NETEX (e.g., 7,500 rpm) in S202.

When it is found in S202 that the detected engine speed NEB is equal to or greater than the prescribed engine speed #NETEX, it is checked in S204 whether the bit of a flag F_NEASUP (initial value 0) is set to 1. The fact that the bit of this flag is set to 1 indicates that high-engine-speed conditions, more specifically high-engine-speed F/C conditions, are established.

The result in S204 is negative (No) in the first program loop, and the program proceeds to S206, where it is checked whether a high-engine-speed F/C (fuel cutoff) signal F_HIFC (shown in FIG. 1 by phantom lines) has been received from the engine controller 40. This is done by checking whether the bit of the pertinent signal from the engine controller 40 is 1 or 0.

When the result in S206 is Yes, the bit of the flag F_NEASUP is set to 1 in S208. When the result in S204 is Yes, S206 and S208 are skipped.

Next, in S210, the detected throttle opening THHF is compared with a prescribed throttle opening #THTEX (e.g., 1/8×WOT). When it is found in S210 that the detected throttle opening THHF is equal to or larger than the prescribed throttle opening #THTEX, an exhaust pipe temperature add amount TEXX is set to a prescribed value #TEXUH (level change per unit time; positive value).

When it is found in S210 that the detected throttle opening THHF is less than the prescribed throttle opening #THTEX, then, in S214, the exhaust pipe temperature add amount TEXX is set to a prescribed throttle opening #THTEX (level change per unit time; positive value).

When the result in S200 is No, the bit of the flag F_NEASUP is reset to 0 in S216, whereafter the detected throttle opening THHF is compared with the prescribed throttle opening #THTEX in S218. Then, depending on the result of the comparison, the exhaust pipe temperature add amount TEXX is set to a third prescribed amount #TEXDH (level change per unit time; negative value) in S220 or to a fourth prescribed amount #TEXDL (level change per unit time; negative value) in S222.

When it is found in S202 that the detected engine speed NEB is less than the prescribed engine speed #NETEX or when the result in S206 is No, the program proceeds to S216.

Figure 15:
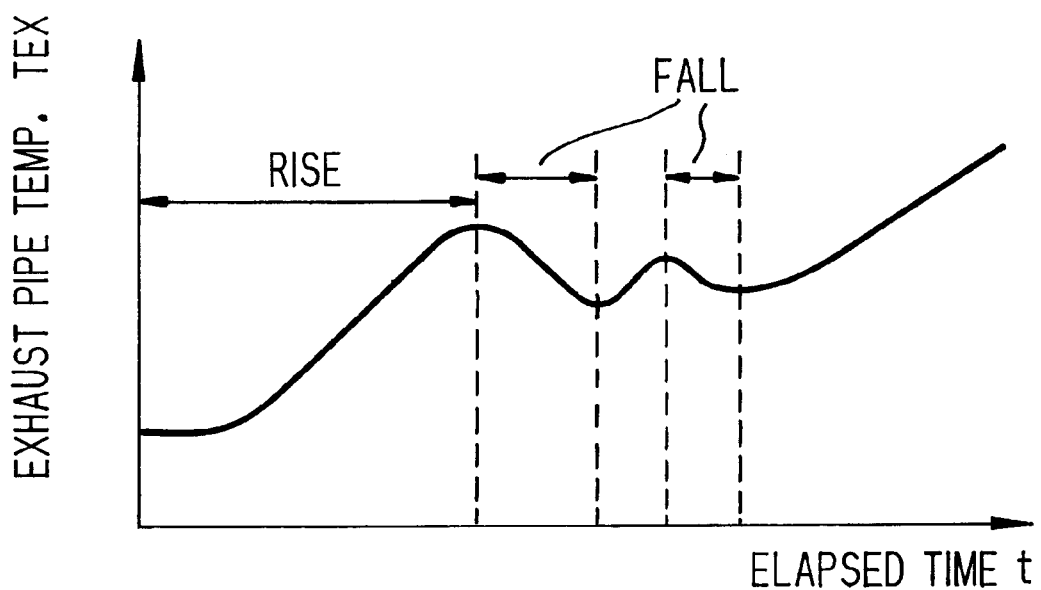
FIG. 15 is an explanatory graph showing the exhaust pipe temperature estimation on the rise side and fall side referred to in the flow chart of FIG. 14.

S210 to S214 and S218 to S222 are for estimating the exhaust pipe temperature. More specifically, S210 to S214 are for estimating the rise side temperature and S218 to S222 are for estimating the fall side temperature. FIG. 15 shows the exhaust pipe temperature estimation on the rise side and fall side.

The flag F_NEASUP indicating whether or not high-engine-speed conditions are established is defined and discrimination is made based on this flag before estimating the exhaust pipe temperature. This is so that the first rise of the high-engine-speed F/C signal, which alternates between 1 and 0 at a prescribed pulse period of engine rotation, can be used as a trigger.

The size relationships among the group of prescribed values are:

Prescribed value #TEXUH>Second prescribed value #TEXUL

Third prescribed amount #TEXDH>Fourth prescribed amount #TEXDL.

The magnitudes of the prescribed values are thus made different for different throttle openings and increase with increasing throttle opening. This is because the exhaust pipe temperature rises with increasing load.

Next, in S224, the selected exhaust pipe temperature add amount TEXX is added to the estimated exhaust pipe temperature TEX (initial value 0) to calculate (update) the estimated exhaust pipe temperature TEX.

Next, in S226, it is checked whether the estimated exhaust pipe temperature TEX is equal to or less than the aforesaid lower limit value TEXLOW. When the result is Yes, it is checked in S228 whether the bit of a flag F_TEXLOW (initial value 0) is set to 1. When the result is No, S230 is skipped.

When the result in S226 is No, i.e., when it is found that the estimated exhaust pipe temperature TEX exceeds the lower limit value TEXLOW, the bit of the flag F_TEXLOW is set to 1 in S232. Therefore, in succeeding program cycles the result in S226 is Yes, the bit of the flag F_TEXLOW is found to be set to 1 in S228, and estimated exhaust pipe temperature TEX is set to the lower limit value TEXLOW in S230.

Next, in S234, it is checked whether the bit of the high-engine-speed-conditions-established flag F_NEASUP is set to 1. When the result is Yes, the estimated exhaust pipe temperature TEX is compared with the aforesaid shift indication flash request threshold value #TEXASIN in S236.

Similar to the first embodiment, when it is found in S236 that the estimated exhaust pipe temperature TEX is equal to or greater than the shift indication flash request threshold value #TEXASIN, the bit of the shift indication flash request flag F__7LDWARN is set to 1 in S238. When the result is No in S234, the bit of the shift indication flash request flag F__7LDWARN is reset to 0 in S240. When it is found in S236 that the estimated exhaust pipe temperature TEX is less than the shift indication flash request threshold value #TEXASIN, no shift indication flash request is made.

Next, in S242, the estimated exhaust pipe temperature TEX is compared with the forced upshift execution threshold #TEXASUPJ, and when it is found in S242 that the estimated exhaust pipe temperature TEX is equal to or greater than the forced upshift execution threshold #TEXASUPJ, the temperature pullback amount for preventing successive upshifts #TEXAUDLY is subtracted from the estimated exhaust pipe temperature TEX in S244. Next, in S246, the bit of the forced upshift request flag F__EXPTEMP is set to 1.

When it is found in S242 that the estimated exhaust pipe temperature TEX is less than the forced upshift execution threshold #TEXASUPJ, the bit of the flag F__EXPTEMP is reset to 0 in S248. Therefore, in the manual gearshift mode control routine not shown in the drawings, control is effected to maintain the current gear (shift position or gear ratio).

Figure 16:
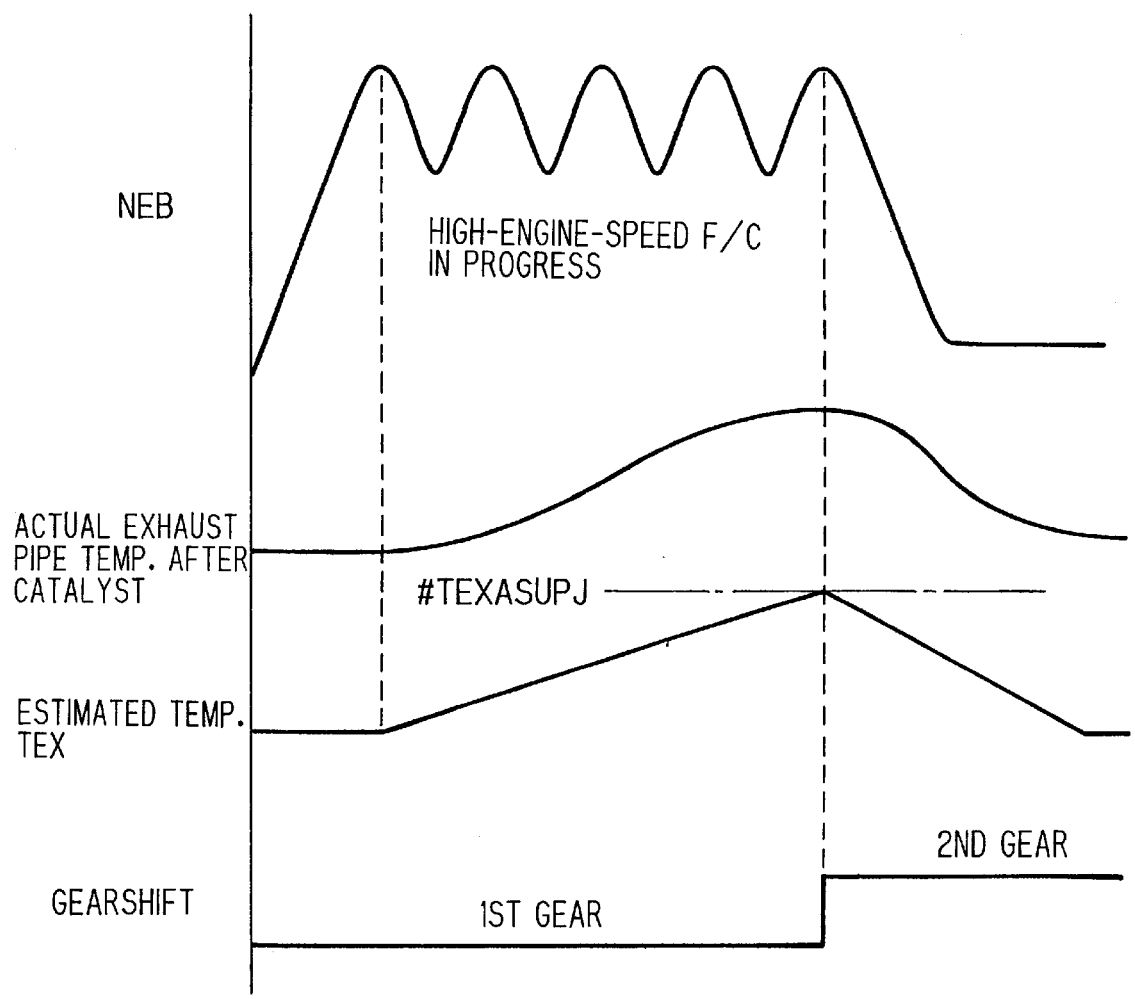
FIG. 16 is a time chart showing the procedures illustrated in the flow chart of FIG. 14.

The foregoing explanation of the control will now be expanded upon with reference to the time chart of FIG. 16. When the engine speed NEB rises to a high-engine-speed level, F/C is intermittently conducted as illustrated. When this happens, fuel cooling cannot occur. The temperature of the engine 10 therefore rises and, as shown in the figure, the actual temperature of the exhaust pipe 36 downstream of the catalytic converter 38 also rises.

Therefore, in this control system according to the second embodiment, every time high-engine-speed F/C is conducted, the estimated exhaust pipe temperature TEX is added either with the prescribed value #TEXUH in S212 or with the prescribed value #TEXUL in S214.

Further, when the estimated exhaust pipe temperature TEX becomes equal to or greater than the threshold #TEXASUPJ, a 1-gear upshift is effected (from first to second gear in the illustrated example). As this lowers the engine speed NEB, it also decreases the actual exhaust pipe temperature.

Moreover, as was explained with reference to S244, the estimated value is corrected by subtracting the prescribed value #TEXAUDLY therefrom and, following S202 or S206, the fall side exhaust pipe temperature is estimated in S216 to S212. Therefore, as shown, the estimated value therefore also declines.

The embodiments are thus configured to have a system for controlling an automatic transmission (12) mounted on a vehicle having an automatic gearshift mode and a manual gearshift mode switchable from the automatic gearshift mode through a device (stick 22a) manually operated by a vehicle driver to designate a gear ratio, including: operating condition detecting means (vehicle speed sensor 20, throttle position sensor 30, shift controller 42) for detecting operating conditions of the vehicle including at least a speed of the vehicle (VSP) and a load (THHF) of an engine (10) mounted on the vehicle; automatic mode gear ratio signal generating means (position sensor 24, shift controller 42) operable in the automatic gearshift mode for retrieving a predetermined gearshift characteristics by at least the detected vehicle speed and the engine load to determine a gear ratio and for generating a first signal indicative of the determined gear ratio; manual mode gear ratio signal generating means (position sensor 24, shift controller 42) operable in the manual mode for generating a second signal indicative of a gear ratio designated by a device (stick 22a) manually operated by a vehicle driver; and gearshift controlling means (shift controller 42) for controlling a gearshift mechanism based on one of the first signal and the second signal. The characteristic feature is that the system includes; exhaust pipe temperature estimating means (shift controller 42, S10–S62, S200–S248) for estimating a temperature (TEX) in an exhaust pipe (38) of the vehicle based on the detected operating conditions; and wherein the gearshift controlling means corrects the designated gear ratio such that the designated gear ratio decreases, if the estimated exhaust pipe temperature (TEX) is found to exceed a predetermined temperature (#TEXASUPJ), when the second signal is generated (S56, S60, S242, S246).

With this arrangement, the system enhances the toughness against (avoidance of) excessive thermal load of components in the vicinity of the exhaust pipe. Moreover, since it does not decrease the gear ratio, i.e., does not shift up, until necessary for ensuring such avoidance, it fully exploits the features of the manual mode and, by this, makes the product more appealing to customers.

Moreover, by estimating the temperature of the exhaust pipe based on the operating condition, the system minimizes the number of required sensors. It can therefore be easily configured. Moreover, upshift decisions are based on the exhaust pipe temperature. Therefore, when the vehicles runs at low speed where the gear ratio is small, a response can be readily made by shifting to the high speed side.

The system is configured to further include: fuel cutoff condition determining means (shift controller 100, S12, S100–S130, S206) for determining whether a fuel cutoff condition is in progress; and wherein the exhaust pipe temperature estimating means estimates the exhaust pipe temperature based additionally on the determined fuel cutoff condition.

Owing to the discrimination of the fuel cutoff state, the system can estimate the exhaust pipe temperature more accurately, thereby achieving the above-mentioned effects and advantages more effectively.

Further, the fuel cutoff condition determining means includes: fuel cutoff condition discriminating means (shift controller 100, S12, S100–S130) for discriminating whether a fuel cutoff condition is in progress based on at least a speed of the engine and the fuel cutoff determining means determines whether the fuel cutoff condition is in progress based on a discrimination of the fuel cutoff condition discriminating means.

Owing to the discrimination of the fuel cutoff state from the operation condition, the system does not need to receive a fuel cut signal from the engine side control system. This further simplifies the configuration.

Further, the system is configured to have engine controlling means (engine controller 40, S206) for controlling operation of the engine and for generating a third signal (F__HIFC) indicating that the fuel cutoff condition is in progress; and the fuel cutoff determining means determines whether the fuel cutoff condition is in progress based on the third signal generated by the engine controlling means.

The system is configured to further include: vehicle acceleration deceleration discriminating mean (shift controller 42, S16) for discriminating whether the vehicle accelerates or decelerates based on at least a speed of the engine; and wherein the exhaust pipe temperature estimating means estimates the exhaust pipe temperature based additionally on the discriminated acceleration/deceleration condition of the vehicle (S18–S34).

With this arrangement, the invention enables precise estimation of the exhaust pipe temperature during deceleration, including in situations such as during trailer-hauling with high engine speed or during hill descent. The engine braking effect is therefore not diminished by an undesired upshift.

The system is configured to further include: cooling component estimating means (shift controller 42, S36) for estimating a cooling component DTEXAIR of the exhaust pipe temperature based on the vehicle speed (VLVH); and wherein the exhaust pipe temperature estimating means estimates the exhaust pipe temperature based additionally on the estimated cooling component of the exhaust pipe temperature (S38). Specifically, the cooling component estimating means estimates the cooling component (DTEXAIR) of the exhaust pipe temperature produced by wind proportional to the vehicle speed (VLVH).

With this arrangement, the system takes the cooling effect of the vehicle air speed into account to enable precise estimation of the exhaust pipe temperature, thereby ensuring avoidance of unnecessary upshifts.

In the system, the exhaust pipe temperature estimating means continues to estimate the exhaust pipe temperature when gearshift controlling means controls the gearshift mechanism based on the first signal (S10, S26–S32, S200, S216–S224).

In the system, the gearshift controlling means operates an indicator (50) before correcting the designated gear ratio such that the designated gear ratio decreases (S52,S238).

It should be noted in the above that the words "exhaust pipe temperature" is used throughout the description, the meaning is almost the same as the "exhaust temperature".

It should also be noted in the above that although the switching mechanism which switches from the automatic gearshift mode to the manual gearshift mode and vise versa, is not limited to that disclosed.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling an automatic transmission mounted on a vehicle having an automatic gearshift mode and a manual gearshift mode switchable from the automatic gearshift mode through a device manually operated by a vehicle driver to designate a gear ratio, including:

operating condition detecting means for detecting operating conditions of the vehicle including at least a speed of the vehicle and a load of an engine mounted on the vehicle;

automatic mode gear ratio signal generating means operable in the automatic gearshift mode for retrieving predetermined gearshift characteristics by at least the detected vehicle speed and the engine load to determine a gear ratio and for generating a first signal indicative of the determined gear ratio;

manual mode gear ratio signal generating means operable in the manual gearshift mode for generating a second signal indicative of the gear ratio designated by the device; and gearshift controlling means for controlling a gearshift mechanism based on one of the first signal and the second signal;

wherein the system includes;

exhaust pipe temperature estimating means for estimating a temperature in an exhaust pipe of the vehicle based on the detected operating conditions;

and wherein the gearshift controlling means corrects the designated gear ratio such that the designated gear ratio decreases, if the estimated exhaust pipe temperature is found to exceed a predetermined temperature, when the second signal is generated.

2. A system according to claim 1, further including:

fuel cutoff condition determining means for determining whether a fuel cutoff condition is in progress;

and wherein the exhaust pipe temperature estimating means estimates the exhaust pipe temperature based additionally on the determined fuel cutoff condition.

3. A system according to claim 2, wherein the fuel cutoff condition determining includes:

fuel cutoff condition discriminating means for discriminating whether a fuel cutoff condition is in progress based on at least a speed of the engine;

and the fuel cutoff determining means determines whether the fuel cutoff condition is in progress based on a discrimination of the fuel cutoff condition discriminating means.

4. A system according to claim 2, further including:

engine controlling means for controlling operation of the engine and for generating a third signal indicating that the fuel cutoff condition is in progress;

and the fuel cutoff determining means determines whether the fuel cutoff condition is in progress based on the third signal generated by the engine controlling means.

5. A system according to claim 1, further including:

vehicle acceleration/deceleration discriminating mean for discriminating whether the vehicle accelerates or decelerates based on at least a speed of the engine;

and wherein the exhaust pipe temperature estimating means estimates the exhaust pipe temperature based additionally on the discriminated acceleration/deceleration condition of the vehicle.

6. A system according to claim 2, further including:

vehicle acceleration/deceleration discriminating mean for discriminating whether the vehicle accelerates or decelerates based on at least a speed of the engine;

and wherein the exhaust pipe temperature estimating means estimates the exhaust pipe temperature based additionally on the discriminated acceleration/deceleration condition of the vehicle.

7. A system according to claim 1, further including:

cooling component estimating means for estimating a cooling component of the exhaust pipe temperature based on the vehicle speed;

and wherein the exhaust pipe temperature estimating means estimates the exhaust pipe temperature based additionally on the estimated cooling component of the exhaust pipe temperature.

8. A system according to claim 7, wherein the cooling component estimating means estimates the cooling component of the exhaust pipe temperature produced by wind proportional to the vehicle speed.

9. A system according to claim 2, further including:

cooling component estimating means for estimating a cooling component of the exhaust pipe temperature based on the vehicle speed;

and wherein the exhaust pipe temperature estimating means estimates the exhaust pipe temperature based additionally on the estimated cooling component of the exhaust pipe temperature.

10. A system according to claim 9, wherein the cooling component estimating means estimates the cooling component of the exhaust pipe temperature produced by wind proportional to the vehicle speed.

11. A system according to claim 1, wherein the exhaust pipe temperature estimating means continues to estimate the exhaust pipe temperature when gearshift controlling means controls the gearshift mechanism based on the first signal.

12. A system according to claim 1, wherein the gearshift controlling means operates an indicator before correcting the designated gear ratio such that the designated gear ratio decreases.

13. A method of controlling an automatic transmission mounted on a vehicle having an automatic gearshift mode and a manual gearshift mode switchable from the automatic mode through a device manually operated by a vehicle driver to designate a gear ratio, including the steps of:

detecting operating conditions of the vehicle including at least a speed of the vehicle and a load of an engine mounted on the vehicle;

retrieving a predetermined gearshift characteristics in the automatic gearshift mode by at least the detected vehicle speed and the engine load to determine a gear ratio and for generating a first signal indicative of the determined gear ratio;

generating a second signal in the manual gearshift mode indicative of a gear ratio designated by the device; and controlling a gearshift mechanism based on one of the first signal and the second signal;

wherein the method includes the steps of;

estimating a temperature in an exhaust pipe of the vehicle based on the detected operating conditions; and correcting the designated gear ratio such that the designated gear ratio decreases, if the estimated exhaust pipe temperature is found to exceed a predetermined temperature, when the second signal is generated.

14. A method according to claim 13, further including the steps of:

determining whether a fuel cutoff condition is in progress; and estimating the exhaust pipe temperature based additionally on the determined fuel cutoff condition.

15. A method according to claim 14, wherein the step of fuel cutoff condition determining includes the steps of:

discriminating whether a fuel cutoff condition is in progress based on at least a speed of the engine; and determining whether the fuel cutoff condition is in progress based on the discrimination.

16. A method according to claim 14, further including the steps of:

controlling operation of the engine and for generating a third signal indicating that the fuel cutoff condition is in progress; and determining whether the fuel cutoff condition is in progress based on the third signal generated by the engine controlling means.

17. A method according to claim 13, further including the steps of:

discriminating whether the vehicle accelerates or decelerates based on at least a speed of the engine; and estimating the exhaust pipe temperature based additionally on the discriminated acceleration/deceleration condition of the vehicle.

18. A method according to claim 14, further including the steps of:

discriminating whether the vehicle accelerates or decelerates based on at least a speed of the engine; and estimating the exhaust pipe temperature based additionally on the discriminated acceleration/deceleration condition of the vehicle.

19. A method according to claim 13, further including the steps of:

estimating a cooling component of the exhaust pipe temperature based on the vehicle speed; and estimating the exhaust pipe temperature based additionally on the estimated cooling component of the exhaust pipe temperature.

20. A method according to claim 19, wherein the step of cooling component estimation estimates the cooling component of the exhaust pipe temperature produced by wind proportional to the vehicle speed.

21. A method according to claim 14, further including the steps of:

estimating a cooling component of the exhaust pipe temperature based on the vehicle speed; and estimating the exhaust pipe temperature based additionally on the estimated cooling component of the exhaust pipe temperature.

22. A method according to claim 21, wherein the step of cooling component estimation estimates the cooling component of the exhaust pipe temperature produced by wind proportional to the vehicle speed.

23. A method according to claim 13, wherein the step of exhaust pipe temperature estimation continues to estimate the exhaust pipe temperature when the gearshift mechanism is controlled based on the first signal.

24. A method according to claim 13, wherein operating an indicator before correcting the designated gear ratio such that the designated gear ratio decreases.

25. A computer program embodied on a computer-readable medium for controlling an automatic transmission mounted on a vehicle having an automatic gearshift mode and a manual gearshift mode switchable from the automatic gearshift mode through a device manually operated by a vehicle driver to designate a gear ratio, including the steps of:

detecting operating conditions of the vehicle including at least a speed of the vehicle and a load of an engine mounted on the vehicle;

retrieving predetermined gearshift characteristics in the automatic gearshift mode by at least the detected vehicle speed and the engine load to determine a gear ratio and for generating a first signal indicative of the determined gear ratio;

generating a second signal in the manual gearshift mode indicative of a gear ratio designated by the device; and controlling a gearshift mechanism based on one of the first signal and the second signal;

wherein the computer program includes the steps of;

estimating a temperature in an exhaust pipe of the vehicle based on the detected operating conditions; and correcting the designated gear ratio such that the designated gear ratio decreases, if the estimated exhaust pipe temperature is found to exceed a predetermined temperature, when the second signal is generated.

* * * * *